US010988576B2

(12) United States Patent
Lee et al.

(10) Patent No.: US 10,988,576 B2
(45) Date of Patent: Apr. 27, 2021

(54) COMPOUND

(71) Applicant: LG CHEM, LTD., Seoul (KR)

(72) Inventors: Seung Hee Lee, Daejeon (KR); Sang Woo Kim, Daejeon (KR); Ki Ho Ahn, Daejeon (KR); Yulliana Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/349,332

(22) PCT Filed: Oct. 31, 2017

(86) PCT No.: PCT/KR2017/012138
§ 371 (c)(1),
(2) Date: May 13, 2019

(87) PCT Pub. No.: WO2018/097496
PCT Pub. Date: May 31, 2018

(65) Prior Publication Data
US 2019/0292317 A1    Sep. 26, 2019

(30) Foreign Application Priority Data

Nov. 25, 2016  (KR) .................. 10-2016-0158399

(51) Int. Cl.
*C08L 83/08*    (2006.01)
*C08G 73/02*    (2006.01)
(Continued)

(52) U.S. Cl.
CPC .......... *C08G 73/026* (2013.01); *C08G 73/10* (2013.01); *C08G 77/26* (2013.01); *C08G 77/388* (2013.01);
(Continued)

(58) Field of Classification Search
None
See application file for complete search history.

(56) References Cited

U.S. PATENT DOCUMENTS

| 6,933,402 B2 * | 8/2005 | Snow ................... C07F 7/0838 |
| | | 558/419 |
| 8,791,222 B2 * | 7/2014 | Sarkar ................ C09B 47/0675 |
| | | 252/582 |

(Continued)

FOREIGN PATENT DOCUMENTS

| JP | 06-019162 A | 1/1994 |
| JP | 1998-251260 A | 9/1998 |

(Continued)

OTHER PUBLICATIONS

Kaliavaradhan et al. "Studies on novel tri-phthalonitrile phenyl polyhedral oligomeric silsesquioxane and the phthalonitrile-epoxy blends" High Performance Polymers, 2016, 28(3), 296-308. (Year: 2016).*

(Continued)

*Primary Examiner* — Robert S Loewe
(74) *Attorney, Agent, or Firm* — Dentons US LLP

(57) ABSTRACT

The compound of the present application has a low melting point and excellent flexibility, and the like, so that a phthalonitrile resin, a prepolymer thereof, or a polymerizable composition forming the same can exhibit excellent workability and a wide process window and it can be made to ensure improved impact strength. The compound can form the phthalonitrile resin or the like into a liquid phase or form it into a rubber phase. Such a phthalonitrile resin or the like can be applied to various applications.

8 Claims, 6 Drawing Sheets

(51) Int. Cl.
- *C08K 3/013* (2018.01)
- *C08G 77/388* (2006.01)
- *C08L 79/08* (2006.01)
- *C08G 77/26* (2006.01)
- *C08G 73/10* (2006.01)

(52) U.S. Cl.
CPC .............. *C08K 3/013* (2018.01); *C08L 79/08* (2013.01); *C08L 83/08* (2013.01)

(56) References Cited

U.S. PATENT DOCUMENTS

| | | |
|---|---|---|
| 2005/0200803 A1 | 9/2005 | Snow et al. |
| 2014/0206812 A1 | 7/2014 | Vij et al. |

FOREIGN PATENT DOCUMENTS

| | | | |
|---|---|---|---|
| JP | 11-184106 A | 7/1999 | |
| JP | 2015010084 A * | 1/2015 | ............... C07F 7/18 |
| KR | 10-0558158 A | 3/2006 | |
| WO | 2016-064298 A1 | 4/2016 | |

OTHER PUBLICATIONS

Ganicz et al. "Side chain polysiloxanes with phthalocyanine moieties" eXPRESS Polymer Letters, 6(5), 2012, 373-382. (Year: 2012).*

Machine translation of JP-2015010084, translation generated Jun. 2020, 53 pages. (Year: 2020).*

Maya, E. M. et al., "Synthesis, Aggregation Behavior and Nonlinear Absorption Properties of Lead Phthalocyanines Substituted with Siloxane Chains", Journal of Materials Chemistry, 2003, vol. 13, pp. 1603-1613.

* cited by examiner

[FIG. 1]
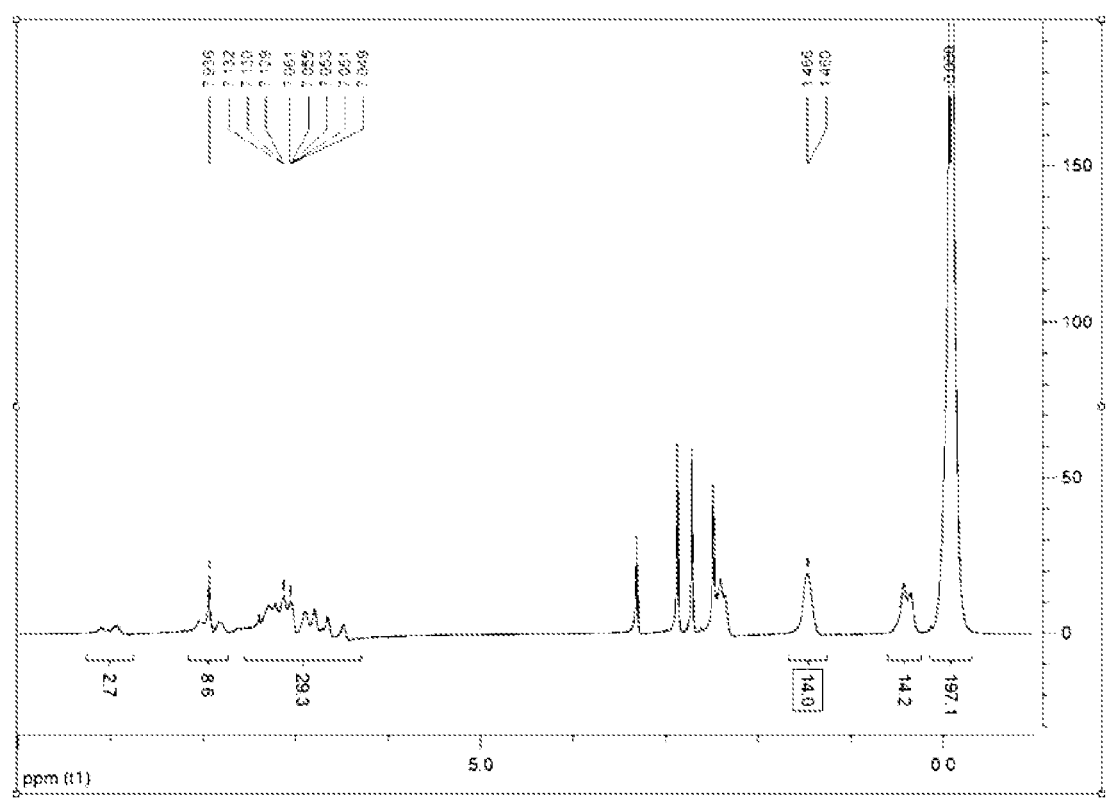

[FIG. 2]
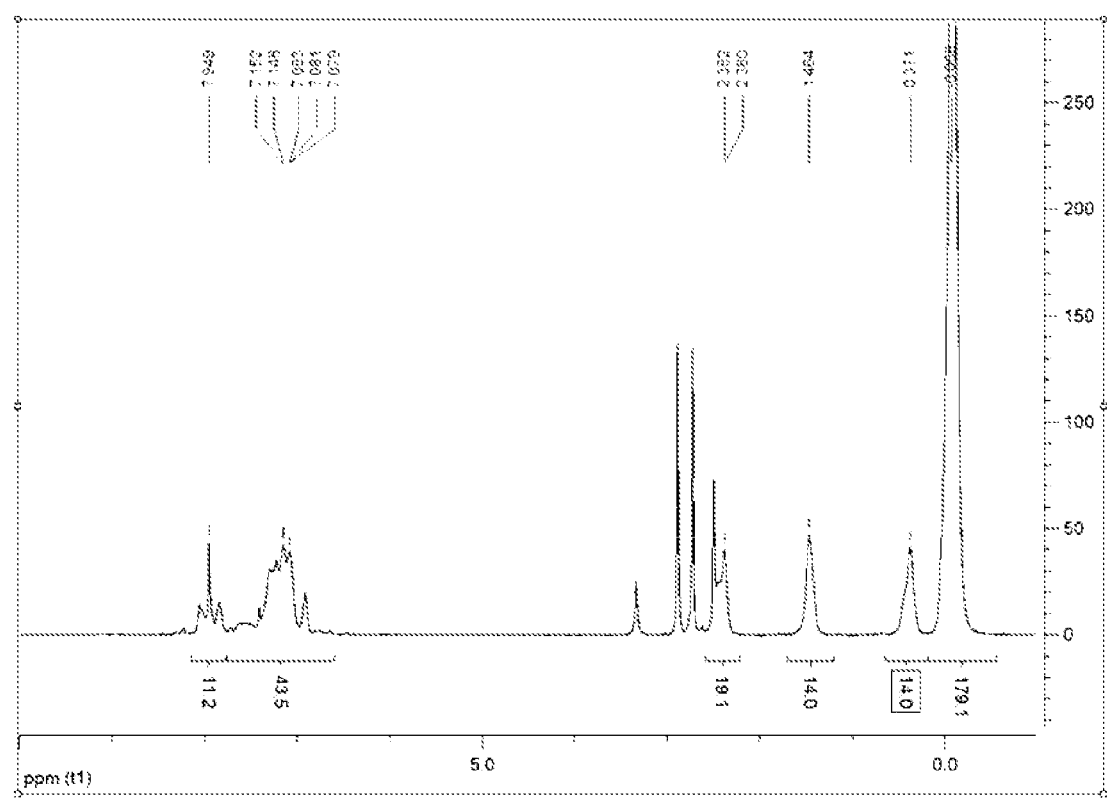

[FIG. 3]
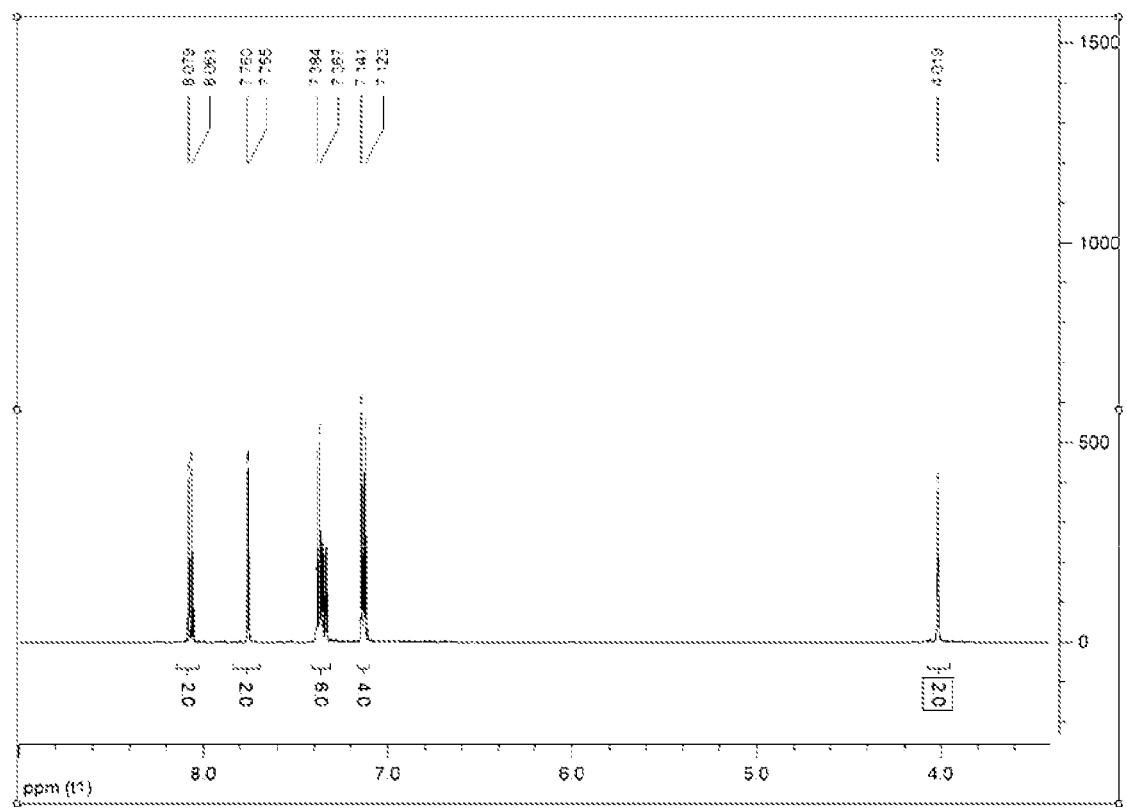

[FIG. 4]
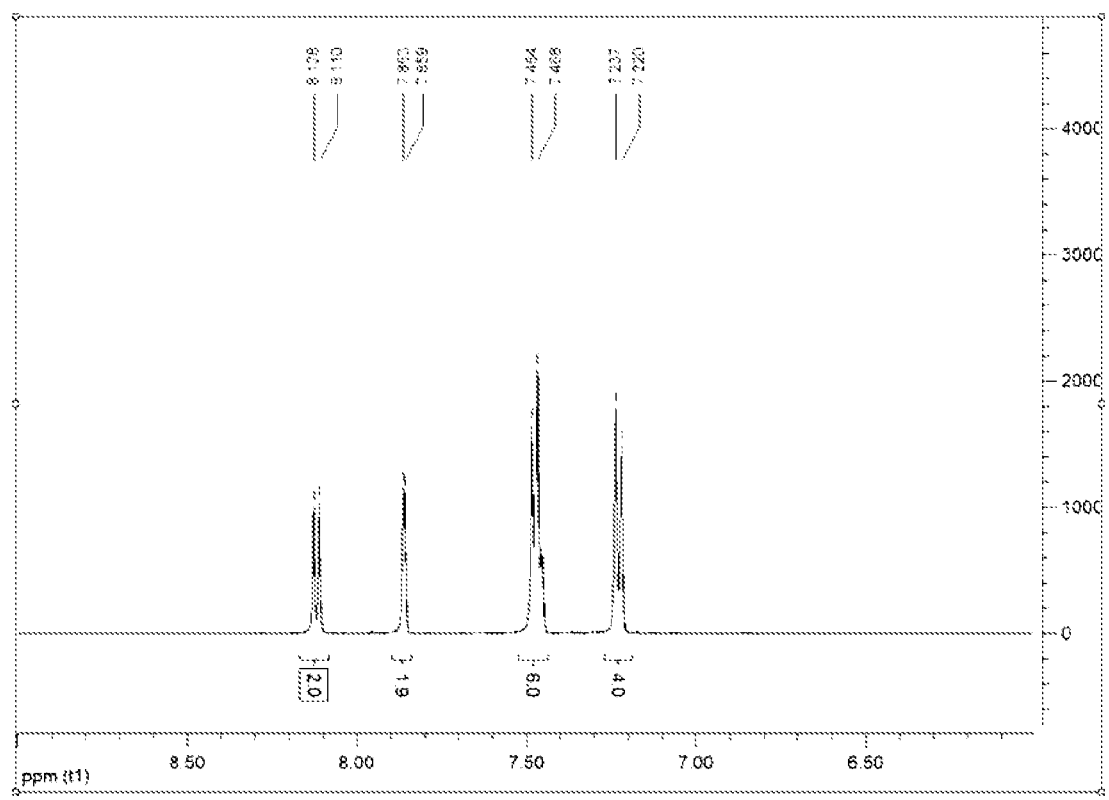

[FIG. 5]
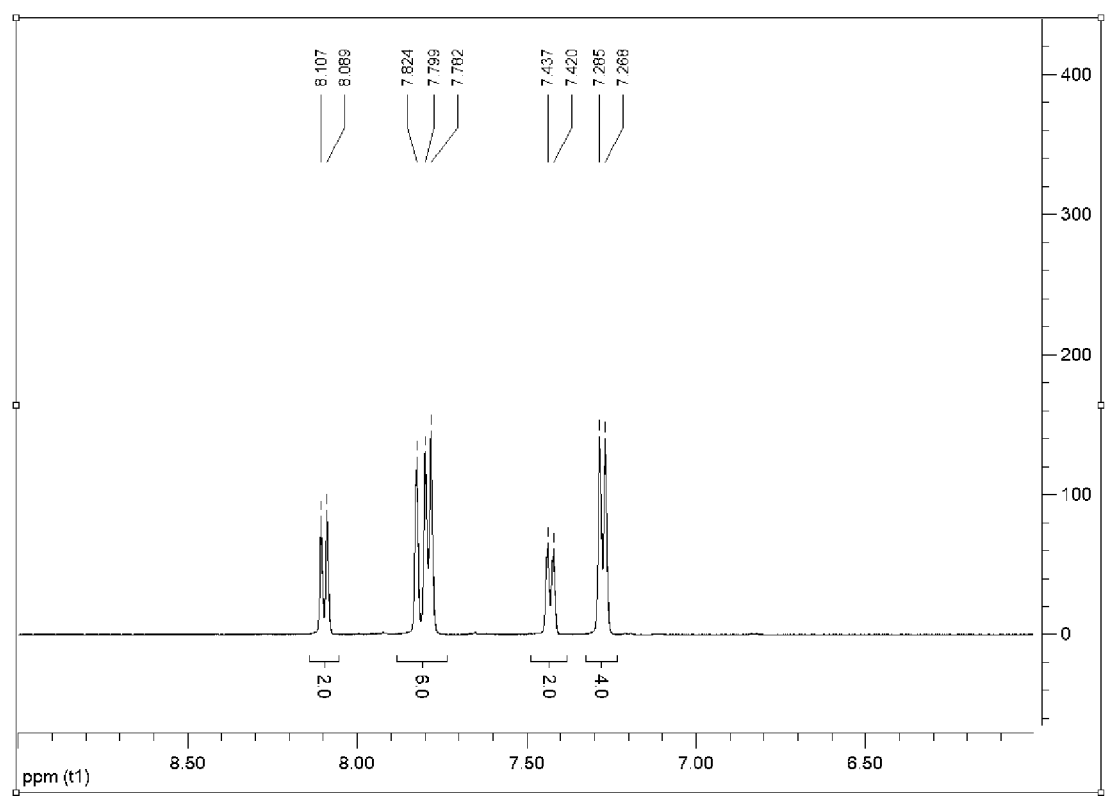

[FIG. 6]
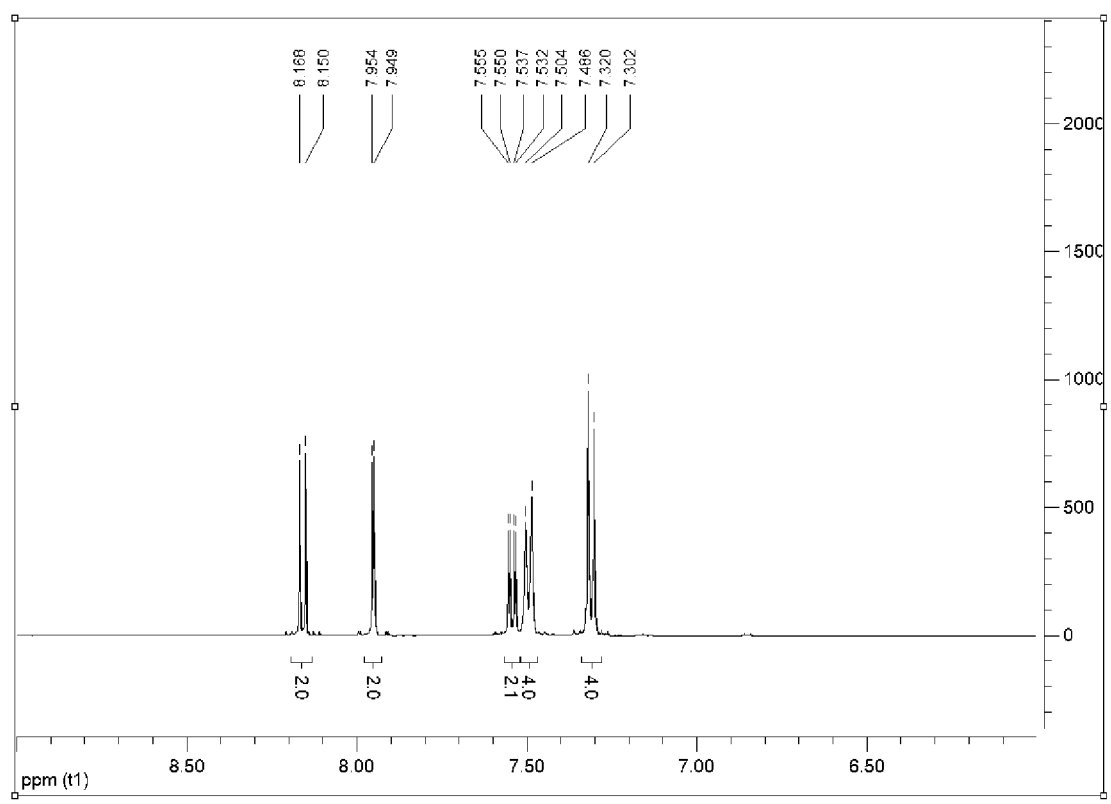

ers and Jones[2,3]

COMPOUND

The present application is a Nation Phase entry of International Application no. PCT/KR2017/012138, filed Oct. 31, 2017, and claims the benefit of priority to Korean Application No. KR 10-2016-0158399 filed Nov. 25, 2016.

FIELD

The present application relates to a compound, a phthalonitrile resin, a polymerizable composition, a prepolymer, a composite, a preparation method and use thereof.

BACKGROUND

A phthalonitrile resin can be used in various applications. For example, a composite formed by impregnating phthalonitrile resin with a filler, such as glass fiber or carbon fiber, can be used as a material for automobiles, airplanes, ships, and the like. The process for producing the composite may comprise, for example, a process of mixing a mixture of phthalonitrile and a curing agent or a prepolymer formed by reaction of the mixture, with the filler and then curing the mixture (see, for example, Patent Document 1).

(Patent Document 1) Korean Patent No. 0558158

SUMMARY

The present application provides a compound, a phthalonitrile resin, a polymerizable composition, a prepolymer, a composite, a preparation method and use thereof.

BRIEF DESCRIPTION OF THE DRAWINGS

FIGS. 1 to 6 show NMR analysis results for compounds prepared in Preparation Examples.

DETAILED DESCRIPTION

In the present application, the term alkyl group or alkoxy group may be an alkyl group or alkoxy group having 1 to 20 carbon atoms, 1 to 16 carbon atoms, 1 to 12 carbon atoms, 1 to 8 carbon atoms or 1 to 4 carbon atoms, unless otherwise specified. The alkyl or alkoxy group may be linear, branched or cyclic, which may be optionally substituted with one or more substituents. In the present application, in the range of the term alkyl group, a haloalkyl group may also be included, which is described below.

In the present application, the term alkenyl group or alkynyl group may be an alkenyl group or alkynyl group having 2 to 20 carbon atoms, 2 to 16 carbon atoms, 2 to 12 carbon atoms, 2 to 8 carbon atoms, or 2 to 4 carbon atoms, unless otherwise specified. The alkenyl group or alkynyl group may be linear, branched or cyclic, which may be optionally substituted with one or more substituents.

In the present application, the term aryl group may mean a monovalent residue derived from benzene, a compound containing a benzene structure, or a derivative of any one of the foregoing, unless otherwise specified. The aryl group may comprise, for example, 6 to 25, 6 to 20, 6 to 15 or 6 to 12 carbon atoms. A specific kind of the aryl group may be exemplified by a phenyl group, a benzyl group, a biphenyl group or a naphthalenyl group, and the like, but is not limited thereto. In addition, the category of the aryl group in the present application may include a so-called aralkyl group or arylalkyl group as well as a functional group ordinarily called an aryl group.

In the present application, the term single bond means a case where there is no atom at the relevant site. For example, in a structure of X—Y—Z, when Y is a single bond, X and Z are directly linked to form a structure of X—Z.

In the present application, the term alkylene group or alkylidene group may mean an alkylene group or alkylidene group having 1 to 20 carbon atoms, 1 to 16 carbon atoms, 1 to 12 carbon atoms, 1 to 8 carbon atoms or 1 to 4 carbon atoms, unless otherwise specified. The alkylene group or alkylidene group may be linear, branched or cyclic. In addition, the alkylene group or alkylidene group may be optionally substituted with one or more substituents.

In the present application, the term alkenyl group or alkynylene group may mean an alkenyl group or alkynylene group having 2 to 20 carbon atoms, 2 to 16 carbon atoms, 2 to 12 carbon atoms, 2 to 8 carbon atoms or 2 to 4 carbon atoms, unless otherwise specified. The alkenyl group or alkynylene group may be linear, branched or cyclic. In addition, the alkenyl group or alkynylene group may be optionally substituted with one or more substituents.

In the present application, an example of the substituent which may optionally be substituted in the alkyl group and the like may be exemplified by halogen such as chlorine or fluorine, a haloalkyl group, an epoxy group such as a glycidyl group, a glycidylalkyl group, a glycidoxyalkyl group or an alicyclic epoxy group, an acryloyl group, a methacryloyl group, an isocyanate group, a thiol group, an alkyl group, an alkoxy group or an aryl group, and the like, but is not limited thereto.

The present application relates to a phthalonitrile compound. The compound of the present invention has a form in which at least one or two or more phthalonitrile groups are bonded to a siloxane skeleton, which is a polymer or oligomer, and in particular, has a form in which at least one or two or more phthalonitrile groups are added to a main chain of the siloxane skeleton, which is a polymer or oligomer.

The compound of the present application has a low melting point due to the siloxane skeleton as above. Therefore, the compound can form a phthalonitrile resin having excellent workability or a prepolymer thereof alone, or by blending it with a phthalonitrile monomer having a high melting point and thus having poor workability. Also, the compound can increase compatibility with other phthalonitrile monomers and curing density by the siloxane skeleton. In addition, the compound has excellent flexibility and heat resistance due to the siloxane skeleton. Accordingly, the compounds can improve poor impact strength, which is a disadvantage of the conventional phthalonitrile resin, particularly, impact strength at a low temperature. When the compound is used alone or contained in an appropriate amount in the blend, it is possible to prepare a liquid phthalonitrile resin or a prepolymer thereof. Such a compound can dramatically increase applicability of the phthalonitrile resin, and for example, the phthalonitrile resin can be applied to high heat-resistant grease or a sealing material and can be manufactured in the form of a rubber or mixed with an appropriate additive such as epoxy to be utilized as an adhesive or the like, by the above characteristics.

Such a compound of the present application can be represented by an average compositional formula of Formula 1 below. In this specification, the fact that a compound is represented by a specific average compositional formula does not only mean that the compound is a single compound represented by an average composition formula, but also means that when two or more compounds is a mixture and a compositional average of components of the mixture is taken, it appears as the average compositional formula.

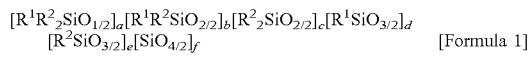

[Formula 1]

In Formula 1, $R^1$ is a substituent of Formula 2 to be described below, $R^2$ is a hydrogen atom, an alkyl group, an alkenyl group, an alkynyl group or an alkoxy group, a, b and c are each a positive number, d, e and f are each 0 or a positive number, and a+b+c+d+e+f=1.

In another example, $R^2$ in Formula 1 may be a hydrogen atom, an alkyl group or an aryl group.

Also, in Formula 1, (b+d)/(b+c+d+e) may be in a range of 0.05 to 0.35, 0.10 to 0.30 or 0.10 to 0.20, b/(b+c) may be in a range of 0.05 to 0.35, 0.10 to 0.30 or 0.10 to 0.20, and (b+c)/(a+b+c+d+e+f) may be in a range of 0.5 to 1, 0.6 to 1 or 0.78 to 1.

In one example, d, e and f may be 0. When d, e and f are 0, the compound represented by the average compositional formula of Formula 1 has a linear structure, and the phthalonitrile resin prepared therefrom can have low friction characteristics.

In Formula 1, $R^1$ may be a substituent of Formula 2 below. In Formula 2 below, X may be linked to the silicon atom of Formula 1.

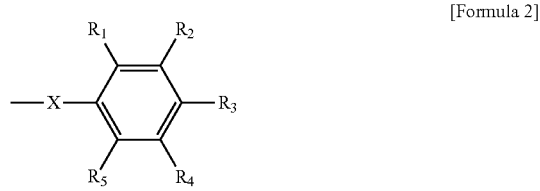

[Formula 2]

In Formula 2, X is a single bond, an oxygen atom, a sulfur atom, $-S(=O)_2-$, a carbonyl group, an alkylene group, an alkenylene group, an alkynylene group, $-C(=O)-X_1-$ or $-X_1-C(=O)-$, where $X_1$ is an oxygen atom, a sulfur atom, $-S(=O)_2-$, an alkylene group, an alkenylene group or an alkynylene group. Also, $R_1$ to $R_5$ are each independently hydrogen, an alkyl group, an alkoxy group, a hydroxy group or a substituent of Formula 3 below.

The substituent of Formula 3 may exist at an ortho, meta or para position based on X in Formula 2.

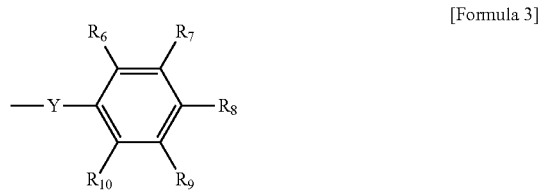

[Formula 3]

In Formula 3, Y is a single bond, an oxygen atom, a sulfur atom, $-S(=O)_2-$, a carbonyl group, an alkylene group, an alkenylene group, an alkynylene group, $-C(=O)-X_2-$ or $-X_2-C(=O)-$, where $X_2$ is an oxygen atom, a sulfur atom, $-S(=O)_2-$, an alkylene group, an alkenylene group or an alkynylene group, and $R_6$ to $R_{10}$ are each independently hydrogen, an alkyl group, an alkoxy group or a cyano group, provided that at least two or two of $R_6$ to $R_{10}$ are each a cyano group.

In Formula 3, two or more cyano groups of $R_6$ to $R_{10}$ may be present at an ortho, meta or para position based on Y of Formula 3. In one example, two of $R_6$ to $R_{10}$ may be each a cyano group, which may be each a meta or para position based on Y of Formula 3, and may be present at the ortho position to each other.

In Formulas 2 and 3, X and Y may be each independently an alkylene group, an alkylidene group, an oxygen atom or a sulfur atom, and a suitable example may include an alkylene group, an alkylidene group or an oxygen atom; or an oxygen atom, but is not limited thereto.

In Formula 2, $R_1$ to $R_5$ are each independently hydrogen, an alkyl group, an alkoxy group, a hydroxy group or a substituent of Formula 3 above, provided that at least one or one of $R_1$ to $R_5$ is a substituent of Formula 3. A suitable example of $R_1$ to $R_5$, other than the substituent of Formula 3, may include hydrogen, an alkyl group or an alkoxy group; or hydrogen or an alkyl group, but is not limited thereto.

In Formula 3, $R_6$ to $R_{10}$ are each independently hydrogen, an alkyl group, an alkoxy group or a cyano group, provided that at least two of $R_6$ to $R_{10}$ are each a cyano group. A suitable example of $R_6$ to $R_{10}$, other than the cyano group, may include hydrogen, an alkyl group or an alkoxy group; or hydrogen or an alkyl group, but is not limited thereto.

Since the compound represented by the average compositional formula of Formula 1 has at least one or more of the substituents of Formula 3, it can be applied to an application for producing a phthalonitrile resin or a composite thereof.

The compound of Formula 1 is a compound in the form of a polymer or an oligomer, which may have, for example, a weight average molecular weight (Mw) in a range of 1,000 to 50,000, 2,500 to 35,000, 4,000 to 20,000 or 6,000 to 9,000. In this specification, the term weight average molecular weight is a conversion value relative to standard polystyrene measured using GPC (gel permeation chromatograph), and the term molecular weight herein means a weight average molecular weight, unless otherwise specified.

In one example, the average composition compound of Formula 1 may be represented by Formula 4 below.

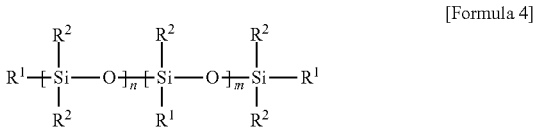

[Formula 4]

In Formula 4 above, n is a number in a range of 1 to 100, m is a number in a range of 1 to 100, m+n is 2 to 100, and $R^1$ and $R^2$ are each the same as defined for $R^1$ and $R^2$ in Formula 1 above.

In one example, m+n in Formula 4 is 2 to 100, 2 to 80 or 2 to 50. When m+n satisfies the above range, a compound capable of providing a polymerizable composition having excellent workability can be produced.

In Formula 4 above, n and m are not particularly limited as long as m+n satisfies the above-described range, but in one example, n may be 1 to 100, 1 to 80 or 1 to 50, and m may be 1 to 100, 1 to 80 or 1 to 50.

The compound may be present in a liquid state at room temperature. Therefore, the compound may have a melting point of lower than room temperature. In the present application, the term normal temperature is a natural temperature without warming or cooling, and may mean a temperature of about 10° C. to 30° C., about 15° C. to 30° C., about 20° C.

to 30° C., 25° C. or 23° C., or so. The melting point of the compound may be, for example, in the range of −20° C. to 25° C.

The compound exhibits a low melting point, and excellent flexibility and heat resistance, and thus when the compound is applied to produce a phthalonitrile resin or a prepolymer thereof, it can improve disadvantages such as workability and impact strength of the phthalonitrile resin, and it can form a liquid resin or a prepolymer thereof and a rubber type resin or a prepolymer thereof, or be utilized as various applications such as high temperature grease, sealing materials or adhesives.

The compound can be effectively used in various applications where so-called phthalonitrile compounds are known to be applicable. For example, the phthalonitrile compound can be effectively used as a raw material or a precursor capable of producing a so-called phthalonitrile resin. The compound may be used as a precursor of a dye such as a phthalocyanine dye, or a precursor or raw material of a fluorescent brightener, a photographic sensitizer or an acid anhydride, in addition to the above-mentioned applications. The compound can be synthesized according to the known synthesis methods of organic compounds.

The present application also relates to a use of the compound. As the use of the compound, as described above, a raw material or precursor of a phthalonitrile resin, a phthalocyanine dye, a fluorescent brightener, a photographic sensitizer or an acid anhydride can be exemplified. As an example of the use, for example, the present application may relate to a phthalonitrile resin. The phthalonitrile resin may comprise a polymerized unit derived from the average composition compound of Formula 1 or the compound of Formula 4. In the present application, the term polymerized unit derived from a certain compound may mean a polymer skeleton formed by polymerization or curing of the compound.

The phthalonitrile resin may also comprise, in addition to the polymerized unit of the compound, other phthalonitrile compounds, that is, polymerized units of phthalonitrile compounds having a chemical structure different from that of the above compound. In this case, the kind of the phthalonitrile compound that can be selected and used is not particularly limited, and known compounds noted to be useful for formation of the phthalonitrile resin and control of its physical properties can be applied. Examples of such compounds can be exemplified by compound known in U.S. Pat. Nos. 4,408,035, 5,003,039, 5,003,078, 5,004,801, 5,132,396, 5,139,054, 5,208,318, 5,237,045, 5,292,854 or 5,350,828, and the like, but are not limited thereto.

The phthalonitrile compound which may be contained in the phthalonitrile resin as a polymerized unit in addition to the above compound can be exemplified by a compound represented by Formula 5 below, but is not limited thereto.

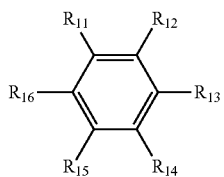

[Formula 5]

In Formula 5, $R_{11}$ to $R_{16}$ are each independently a hydrogen atom, an alkyl group, an alkenyl group, an alkynyl group, an alkoxy group, an aryl group or a substituent of Formula 6 or 7 below. In Formula 5, at least two, or two to three, of $R_{11}$ to $R_{16}$ may be a substituent of Formula 6 or 7 below.

In Formula 5, the substituents of Formula 6 or 7 in which at least two or two to three are present may exist at an ortho, meta or para position to each other.

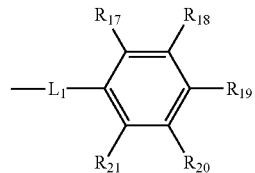

[Formula 6]

In Formula 6, $L_1$ is a single bond, an oxygen atom, a sulfur atom, —S(=O)$_2$—, a carbonyl group, an alkylene group, an alkenylene group, an alkynylene group, —C(=O)—X$_3$— or —X$_3$—C(=O)—, where $X_3$ is an oxygen atom, a sulfur atom, —S(=O)$_2$—, an alkylene group, an alkenylene group or an alkynylene group, and $R_{17}$ to $R_{21}$ are each independently hydrogen, an alkyl group, an alkoxy group, an aryl group or a cyano group, provided that two or more of $R_{17}$ to $R_{21}$ are each a cyano group. In Formula 6, the cyano groups in which at least two are present may exist at an ortho, meta or para position to each other. In one example, two cyano groups in Formula 6 may be present, and each cyano group may be a meta or para relative to $L_1$ and may be present at a position which is ortho to each other.

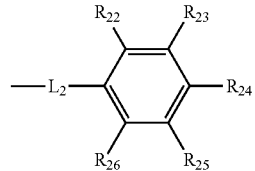

[Formula 7]

In Formula 7, $L_2$ is a single bond, an oxygen atom, a sulfur atom, —S(=O)$_2$—, a carbonyl group, an alkylene group, an alkenylene group, an alkynylene group, —C(=O)—X$_4$— or —X$_4$—C(=O)—, where $X_4$ is an oxygen atom, a sulfur atom, —S(=O)$_2$—, an alkylene group, an alkenylene group or an alkynylene group, and $R_{22}$ to $R_{26}$ are each independently hydrogen, an alkyl group, an alkoxy group, an aryl group or a substituent of Formula 6 above, provided that one or more of $R_{22}$ to $R_{26}$ is a substituent of Formula 6 above. In Formula 7, the substituent of Formula 6 in which at least one is present may exist at an ortho, meta or para position based on $L_2$.

In the phthalonitrile resin, the polymerized unit of the compound of Formula 1 or 4 above may be a polymerized unit formed by reaction of the compound and a curing agent. In this case, the type of the usable curing agent is not particularly limited as long as it is capable of reacting with the compound of Formula 1 or 4 to form a polymer, and for example, any compound known to be useful for formation of a phthalonitrile resin can also be used. Such curing agents are known in a variety of documents including the above-mentioned U.S. patents.

In one example, an amine compound such as an aromatic amine compound or a hydroxy compound can be used as the curing agent. In the present application, the hydroxy compound may mean a compound containing at least one or two hydroxy groups in the molecule. Curing agents capable of curing a phthalonitrile compound to form a resin are variously known, and these curing agents can be applied in most cases in the present application.

In one example, a compound of Formula 8 below may be used as the curing agent.

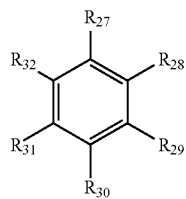

[Formula 8]

In Formula 8, $R_{27}$ to $R_{32}$ are each independently hydrogen, an alkyl group, an alkoxy group, an aryl group, an amine group or a substituent of Formula 9 below, provided that two or more of $R_{27}$ to $R_{32}$ are each an amine group or a substituent of Formula 9 below.

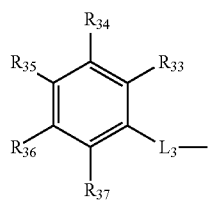

[Formula 9]

In Formula 9, $L_3$ is an alkylene group, an alkylidene group, an oxygen atom or a sulfur atom, and $R_{33}$ to $R_{37}$ are each hydrogen, an alkyl group, an alkoxy group, an aryl group or an amine group, provided that at least one of $R_{33}$ to $R_{37}$ is an amine group.

When the substituent of Formula 9 is present, $L_3$ in the above structure may be linked to the benzene ring of Formula 8.

In one example, the curing agent may be a compound wherein two of $R_{27}$ to $R_{32}$ in Formula 8 are each the substituent of Formula 9. In this case, in Formula 8, the two substituents of Formula 9 may be a structure based on any one of them, and the other is present at an otho, meta or para position. In this case, any one of $R_{33}$ to $R_{37}$ in the substituents of Formula 9 may be an amine group.

The present application also relates to a polymerizable composition. The polymerizable composition may comprise the above-described compound of Formula 1 or 4. Since details for the compounds of Formula 1 or 4 in the polymerizable composition of the present application are the same as those described above for the compound of the present application, they will be omitted. The polymerizable composition may further comprise a curing agent together with the compound of Formula 1 or 4.

The polymerizable composition may also comprise other phthalonitrile compounds in addition to the compound of Formula 1 or 4. As the other phthalonitrile compound or curing agent, for example, a curing agent as described above can be used.

The ratio of the curing agent in the polymerizable composition is not particularly limited. The ratio can be adjusted so that the desired hardenability can be ensured in consideration of, for example, the ratio or type of the curable component such as the compound of Formula 1 or 4 or other phthalonitrile compounds contained in the composition. For example, the curing agent may be contained in the polymerizable composition in an amount of about 0.02 mol to 2.5 mol, about 0.02 mol to 2.0 mol, or about 0.02 mol to 1.5 mol or so per mol of the compound of Formula 1 or 4 contained in the polymerizable composition or the compound and other phthalonitrile compounds. However, the above ratios are only examples of the present application. In general, if the ratio of the curing agent in the polymerizable composition increases, the process window tends to become narrow, and if the ratio of the curing agent decreases, the hardenability tends to become insufficient, so that considering these points, a suitable ratio of the curing agent can be selected.

The polymerizable composition of the present application can exhibit an appropriate processing temperature and a wide process window while having excellent hardenability.

In one example, the processing temperature of the polymerizable composition may be in a range of −20° C. to 150° C., −20° C. to 100° C. or −10° C. to 100° C. In this case, the polymerizable composition may have a process window, that is, an absolute value of the difference (Tonset−Tp) between the processing temperature (Tp) and a curing initiation temperature (Tonset) of the compound of Formula 1 or 4 or the curing agent, of 110° C. or higher, 140° C. or higher, or 170° C. or higher. In one example, the curing temperature (Tonset) may be higher than the processing temperature (Tp). By using the polymerizable composition, such a range may be advantageous in ensuring proper workability, for example, in the course of producing a composite to be described below. Here, the upper limit of the window process is not particularly limited, but for example, the absolute value of the difference (Tonset−Tp) between the processing temperature (Tp) and the curing temperature (Tonset) may be 400° C., 330° C. or lower, or 270° C. or lower.

In this specification, the term processing temperature (Tp) may mean a melting point, softening point or glass transition temperature of the relevant polymer or oligomer component, and the curing temperature (Tonset) may mean a curing initiation temperature.

The polymerizable composition may further comprise various additives. An example of such an additive can be exemplified by various fillers. The material that can be used as the filler is not particularly limited, and all the known fillers suitable for the intended use may be used. An exemplary filler can be a metal material, a ceramic material, glass, metal oxide, metal nitride or a carbon-based material, and the like, but is not limited thereto. In addition, the form of the filler is also not particularly limited and may be various forms, for example, a fibrous material such as aramid fiber, glass fiber or ceramic fiber, or a woven fabric, nonwoven fabric, string or cord formed by the material, particles comprising nanoparticles, polygons or other amorphous forms, and the like. Here, as the carbon-based material, graphite, graphene or carbon nanotubes, and the like, or derivatives and isomers such as their oxides, can be exemplified. However, the components, in which the polymerizable composition may further comprise, are not limited to the above, and for example, various monomers known to be applicable to produce so-called engineering plastics such as polyimide, polyamide or polystyrene, or other different additives may also be included without limitation depending on the purpose.

The present application also relates to a prepolymer formed by reaction of the polymerizable composition, that is, the polymerizable composition comprising the compound of Formula 1 or 4 and the curing agent.

In the present application, the term prepolymer state is a state where the compound of Formula 1 or 4 and the curing agent undergo a certain degree of polymerization in the polymerizable composition (for example, a state where polymerization in a step of a so-called stage A or B has occurred), but do not reach the completely polymerized state and exhibit appropriate fluidity, and for example may mean a state capable of processing a composite, as described below. In one example, the prepolymer state is a state where polymerization of the polymerizable composition proceeds to some extent, which may be a solid state such as flour or powder at room temperature of the composition.

The prepolymer may also exhibit excellent hardenability, a suitable processing temperature and a wide process window.

For example, the processing temperature of the prepolymer may be in the range of −20° C. to 150° C., −20° C. to 100° C., or −10° C. to 100° C. In this case, the process window of the prepolymer, that is, the absolute value of the difference (Tonset−Tp) between the processing temperature (Tp) and the curing temperature (Tonset) of the prepolymer may be 110° C. or higher, 140° C. or higher, or 170° C. or higher. In one example, the curing temperature (Tonset) may be higher than the processing temperature (Tp). By using the prepolymer, such a range may be advantageous in securing proper workability, for example, in the process of preparing a composite to be described below. For example, the absolute value of the difference (Tonset−Tp) between the processing temperature (Tp) and the curing temperature (Tonset) may be 400° C. or lower, 330° C. or lower, or 270° C. or lower.

The prepolymer may further comprise any known additive in addition to the above components. As an example of such an additive, the above-mentioned fillers and the like can be exemplified, without being limited thereto.

The present application also relates to a composite. The composite may comprise the above-described phthalonitrile resin and filler. As described above, through the compound of Formula 1 or 4 of the present application excellent hardenability, a suitable processing temperature and a wide process window can be achieved, and accordingly, a so-called reinforced resin composite (reinforced polymer composite) comprising various fillers can be easily formed. The composite thus formed may comprise the phthalonitrile resin and the filler, and for example, may be applied to various applications including durables, and the like for automobiles, airplanes, ships or the like.

The kind of the filler is not particularly limited and may be suitably selected in consideration of the intended use. A specific example of the filler is as described above, but is not limited thereto.

Also, the ratio of the filler is not particularly limited, and may be set in an appropriate range depending on the intended use.

The present application also relates to a precursor for preparing the composite, wherein the precursor may comprise, for example, the polymerizable composition and the filler as described above, or the prepolymer and the filler as described above.

The composite can be prepared in a known manner using the precursor. For example, the composite can be formed by curing the precursor.

In one example, the precursor may be prepared by combining the polymerizable composition, which is prepared by combining the compound of Formula 1 or 4 as described above with a curing agent in a molten state, or the prepolymer with the filler in a molten state, by heating or the like. For example, the precursor thus produced may be molded into a desired shape and then cured to prepare the above-described composite. The polymerizable composition or prepolymer has an appropriate processing temperature, a wide process temperature, and superior hardenability, so that molding and curing can be efficiently performed in the above processes.

In the above processes, the method of forming the prepolymer or the like, and the method for preparing the composite by combining such a prepolymer or the like with the filler, followed by processing and curing, and the like may be carried out according to known methods.

The present application may also relate to a precursor of a phthalocyanine dye, a precursor of a fluorescent brightener or a precursor of a photographic sensitizer, comprising the compound, or relate to an acid anhydride derived from the compound. The method for forming the precursor or the method for producing the acid anhydride, by using the compound is not particularly limited and all the known methods noted to be capable of producing the precursor or acid anhydride using the phthalonitrile compound can be applied.

The compound of the present application has a low melting point and excellent flexibility, and the like, so that a phthalonitrile resin or a prepolymer thereof, or a polymerizable composition forming the same, can exhibit excellent workability and a wide process window and it can be made to ensure improved impact strength. The compound can form the phthalonitrile resin or the like into a liquid phase or form it into a rubber phase. Such a phthalonitrile resin or the like can be applied to various applications, and for example, can be applied to all fields to which so-called engineering plastics are applied, all fields in which heat resistant polymers are used, high heat-resistant parts, resins and resin complexes used as high heat-resistant parts, high heat-resistant parts for automobile industry and electronic industry, heat-resistant grease, sealing materials, adhesives, pressure-sensitive adhesives, buffers or encapsulants for LED or OLED, and the like. In addition, since the compound can form a phthalonitrile resin or a composite having low friction characteristics, it can also be applied to various mechanical parts requiring low friction characteristics. Furthermore, the compound can also be applied to applications such as a precursor of a phthalocyanine dye, a precursor of a fluorescent brightener or a precursor of a photographic sensitizer, or production of an acid anhydride.

EXAMPLES

Hereinafter, the phthalonitrile resin and the like of the present application will be specifically described by way of examples and comparative examples, but the scope of the resins and the like is not limited to the following examples.

1. NMR (Nuclear Magnetic Resonance) Analysis

NMR analysis was carried out by using a 500 MHz NMR equipment from Agilent as the manufacturer's manual. A sample for NMR measurement was prepared by dissolving the compound to be measured in DMSO (dimethyl sulfoxide)-d6 and Acetone-d6.

2. DSC (Differential Scanning Calorimetry) Analysis

DSC analysis was carried out in a $N_2$ flow atmosphere using a Q20 system from TA instrument while raising the temperature from 35° C. to 400° C. or 450° C. at a heating rate of 10° C./min.

3. GPC (Gel Permeation Chromatography) Analysis

GPC analysis was performed according to the manufacturer's manual using a 1200 series from Agilent. A sample for measurement of GPC was prepared by dissolving the compound to be measured in tetrahydrofuran (THF), G1362 RID and G1315BDAD were used as a detector, and polystyrene was used as a standard.

Preparation Example 1. Synthesis of Compound (PN1)

A compound (PN1) having an average compositional formula of Formula A below was synthesized in the following manner. 110 g of a compound having an average compositional formula of Formula B below and having a weight average molecular weight of 6,700, and 200 g of DMF (dimethylformamide) were added to a 3 neck RBF (round bottom flask) and dissolved by stirring at room temperature. Subsequently, 25 g of a compound of Formula C below was added thereto, and 60 g of DMF (dimethylformamide) was added thereto, and then dissolved by stirring. Subsequently, 29 g of potassium carbonate and 50 g of DMF (dimethylformamide) were added together and the temperature was raised to 85° C. with stirring. After reacting for about 5 hours in the above state, it was cooled to room temperature. 0.2N hydrochloric acid aqueous solution was poured to the cooled reaction solution. Chloroform was added to the mixed solution to extract a product, and the extracted product was washed with water. Chloroform and DMF (dimethylformamide) as a reaction solution were removed by vacuum distillation. After removing water and the residual solvent, the compound (PN1) having an average compositional formula of Formula A below and having a weight average molecular weight of 7,190 was obtained in a yield of about 88 wt %. The NMR results for the compound were described in FIG. 1.

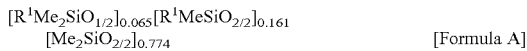
[Formula A]

In Formula A, Me is a methyl group, and $R^1$ is a 2-(2-hydroxyphenyl)ethyl group or 4-(2-ethylphenoxy) phthalonitrile which is a substituent represented by Formula 2.

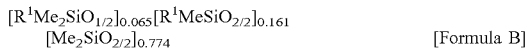
[Formula B]

In Formula B, Me is a methyl group and R' is a 2-(2-hydroxyphenyl) ethyl group.

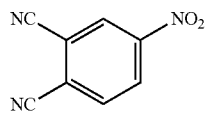
[Formula C]

Preparation Example 2. Synthesis of Compound (PN2)

A compound (PN2) having an average compositional formula of Formula D below was synthesized in the following manner. 95 g of a compound having an average compositional formula of Formula B above and having a weight average molecular weight of 6,700, and 200 g of DMF (dimethylformamide) were added to a 3 neck RBF (round bottom flask) and dissolved by stirring at room temperature. Subsequently, 36.5 g of the compound of Formula C above was added thereto, and 100 g of DMF (dimethylformamide) was added thereto, and then dissolved by stirring. Subsequently, 44 g of potassium carbonate and 50 g of DMF were added together and the temperature was raised to 85° C. with stirring. After reacting for about 5 hours in the above state, it was cooled to room temperature. The cooled reaction solution was poured to 0.2N hydrochloric acid aqueous solution. Chloroform was added to the mixed solution to extract a product, and the extracted product was washed with water. Chloroform and DMF (dimethylformamide) as a reaction solution were removed by vacuum distillation. After removing water and the residual solvent, the compound (PN2) having an average compositional formula of Formula D below and having a weight average molecular weight of 7,660 was obtained in a yield of about 85 wt %. The NMR results for the compound of Formula D were described in FIG. 2.

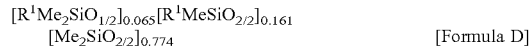
[Formula D]

In Formula D, Me is a methyl group and IV is a 4-(2-ethylphenoxy)phthalonitrile group which is a substituent represented by Formula 2.

Preparation Example 3. Synthesis of Compound (PN3)

A compound (PN3) of Formula E below was synthesized in the following manner. 28.0 g of 4,4'-bis(hydroxyphenyl) methane and 150 ml of DMF (dimethylformamide) were introduced into a 3 neck RBF (round bottom flask) and dissolved by stirring at room temperature. Subsequently, 48.5 g of the compound of Formula C above was added thereto, and 50 g of DMF (dimethylformamide) was added thereto, and then dissolved by stirring. Subsequently, 58.1 g of potassium carbonate and 50 g of DMF were added together and the temperature was raised to 85° C. with stirring. After reacting for about 5 hours in the above state, it was cooled to room temperature. The cooled reaction solution was neutralized and precipitated by pouring it into a 0.2N hydrochloric acid aqueous solution, and washed with water after filtering. The filtered reactant was then dried in a vacuum oven at 100° C. for one day and after removing water and the residual solvent, the compound (PN3) of Formula E below was obtained in a yield of about 83 wt %. The NMR results for the compound of Formula F were described in FIG. 3.

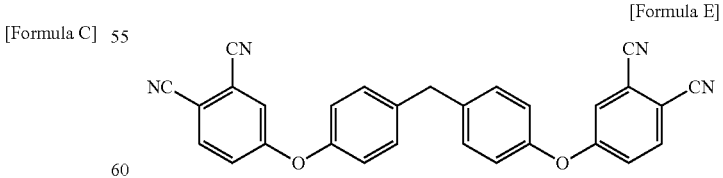
[Formula E]

Preparation Example 4. Synthesis of Compound (PN4)

A compound (PN4) of Formula F below was synthesized in the following manner. 32.7 g of a compound of Formula G below and 120 g of DMF (dimethylformamide) were added to a 3 neck RBF (round bottom flask) and dissolved by stirring at room temperature. Subsequently, 51.9 g of the compound of Formula C above was added, and 50 g of DMF (dimethylformamide) was added and dissolved by stirring. Subsequently, 62.2 g of potassium carbonate and 50 g of DMF were added together and the temperature was raised to 85° C. with stirring. After reacting for about 5 hours in the above state, it was cooled to room temperature. The cooled reaction solution was neutralized and precipitated by pouring it into a 0.2N hydrochloric acid aqueous solution, and washed with water after filtering. The filtered reactant was then dried in a vacuum oven at 100° C. for one day and after removing water and the residual solvent, the compound (PN4) of Formula F below was obtained in a yield of about 80 wt %. The NMR results for the compound of Formula F were described in FIG. 4.

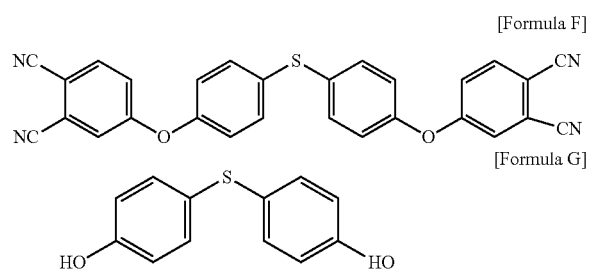

[Formula F]

[Formula G]

Preparation Example 5. Synthesis of Compound (PN5)

A compound (PN5) of Formula H below was synthesized in the following manner. 27.9 g of a compound of Formula I below and 100 g of DMF (dimethylformamide) were introduced into a 3 neck RBF (round bottom flask) and dissolved by stirring at room temperature. Subsequently, 51.9 g of the compound of Formula C above was added, and 50 g of DMF (dimethylformamide) was added and dissolved by stirring. Subsequently, 62.2 g of potassium carbonate and 50 g of DMF were added together and the temperature was raised to 85° C. with stirring. After reacting for about 5 hours in the above state, it was cooled to room temperature. The cooled reaction solution was neutralized and precipitated by pouring it into a 0.2N hydrochloric acid aqueous solution, and washed with water after filtering. The filtered reactant was then dried in a vacuum oven at 100° C. for one day and after removing water and the residual solvent, the compound (PN5) of Formula H below was obtained in a yield of about 83 wt %. The NMR results for the compound of Formula H were described in FIG. 5.

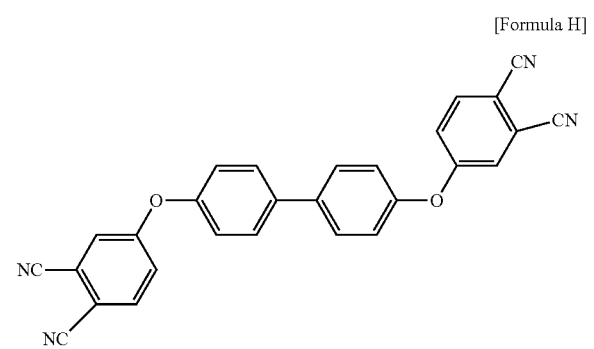

[Formula H]

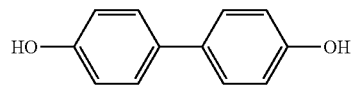

[Formula I]

Preparation Example 6. Synthesis of Compound (PN6)

A compound (PN6) of Formula J below was synthesized in the following manner. 50.4 g of a compound of Formula K below and 150 g of DMF (dimethylformamide) were introduced into a 3 neck RBF (round bottom flask) and dissolved by stirring at room temperature. Then, 51.9 g of the compound of Formula C above was added, and 50 g of DMF (dimethylformamide) was added and dissolved by stirring. Subsequently, 62.2 g of potassium carbonate and 50 g of DMF were added together and the temperature was raised to 85° C. with stirring. After reacting for about 5 hours in the above state, it was cooled to room temperature. The cooled reaction solution was neutralized and precipitated by pouring it into a 0.2N hydrochloric acid aqueous solution, and washed with water after filtering. The filtered reactant was then dried in a vacuum oven at 100° C. for one day and after removing water and the residual solvent, the compound (PN6) of Formula J below was obtained in a yield of about 87 wt %. The NMR results for the compound of Formula J were described in FIG. 6.

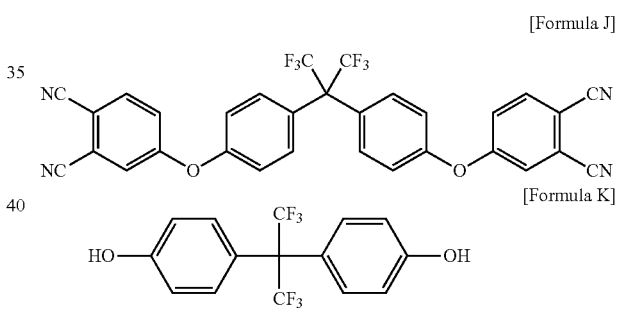

[Formula J]

[Formula K]

Preparation Example 7. Synthesis of Compound (CA1)

As a compound of Formula L below, a commercially available product from TCI (Tokyo Chemical Industry Co., Ltd.) was purchased and used without further purification.

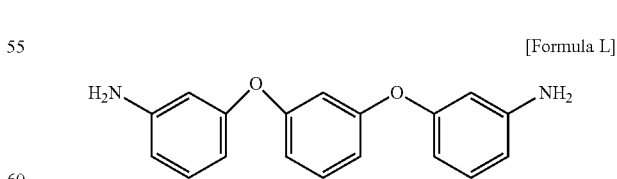

[Formula L]

Example 1

A polymerizable composition was prepared by formulating the curing agent (CA1) of Preparation Example 7 to the compound (PN1) of Preparation Example 1 so as to be present at about 0.12 mol per mol of the compound (PN1), and the physical properties were evaluated.

Example 2

A polymerizable composition was prepared by formulating the curing agent (CA1) of Preparation Example 7 to the compound (PN2) of Preparation Example 2 so as to be present at about 0.12 mol per mol of the compound (PN2), and the physical properties were evaluated.

Example 3

A polymerizable composition was prepared by formulating the curing agent (CA1) of Preparation Example 7 to a mixture (PN1:PN3 (weight ratio)=20:80) of the compound (PN1) of Preparation Example 1 and the compound (PN3) of Preparation Example 3 so as to be present at about 0.12 mol per mol of the mixture, and the physical properties were evaluated.

Example 4

A polymerizable composition was prepared by formulating the curing agent (CA1) of Preparation Example 7 to a mixture (PN1:PN4 (weight ratio)=20:80) of the compound (PN1) of Preparation Example 1 and the compound (PN4) of Preparation Example 4 so as to be present at about 0.12 mol per mol of the mixture, and the physical properties were evaluated.

Example 5

A polymerizable composition was prepared by formulating the curing agent (CA1) of Preparation Example 7 to a mixture (PN1:PN5 (weight ratio)=20:80) of the compound (PN1) of Preparation Example 1 and the compound (PN5) of Preparation Example 5 so as to be present at about 0.12 mol per mol of the mixture, and the physical properties were evaluated.

Example 6

A polymerizable composition was prepared by formulating the curing agent (CA1) of Preparation Example 7 to a mixture (PN1:PN6 (weight ratio)=20:80) of the compound (PN1) of Preparation Example 1 and the compound (PN6) of Preparation Example 6 so as to be present at about 0.12 mol per mol of the mixture, and the physical properties were evaluated.

Example 7

A polymerizable composition was prepared by formulating the curing agent (CA1) of Preparation Example 7 to a mixture (PN2:PN3 (weight ratio)=20:80) of the compound (PN2) of Preparation Example 2 and the compound (PN3) of Preparation Example 3 so as to be present at about 0.12 mol per mol of the mixture, and the physical properties were evaluated.

Example 8

A polymerizable composition was prepared by formulating the curing agent (CA1) of Preparation Example 7 to a mixture (PN2:PN5 (weight ratio)=20:80) of the compound (PN2) of Preparation Example 2 and the compound (PN5) of Preparation Example 3 so as to be present at about 0.12 mol per mol of the mixture, and the physical properties were evaluated.

Example 9

A polymerizable composition was prepared by formulating the curing agent (CA1) of Preparation Example 7 to a mixture (PN2:PN3 (weight ratio)=50:50) of the compound (PN2) of Preparation Example 2 and the compound (PN3) of Preparation Example 3 so as to be present at about 0.12 mol per mol of the mixture, and the physical properties were evaluated.

Example 10

A polymerizable composition was prepared by formulating the curing agent (CA1) of Preparation Example 7 to a mixture (PN2:PN5 (weight ratio)=50:50) of the compound (PN2) of Preparation Example 2 and the compound (PN5) of Preparation Example 5 so as to be present at about 0.12 mol per mol of the mixture, and the physical properties were evaluated.

Comparative Example 1

A polymerizable composition was prepared by formulating the curing agent (CA1) of Preparation Example 7 to the compound (PN3) of Preparation Example 3 so as to be present at about 0.12 mol per mol of the compound (PN3), and the physical properties were evaluated.

Comparative Example 2

A polymerizable composition was prepared by formulating the curing agent (CA1) of Preparation Example 7 to the compound (PN4) of Preparation Example 4 so as to be present at about 0.12 mol per mol of the compound (PN4), and the physical properties were evaluated.

Comparative Example 3

A polymerizable composition was prepared by formulating the curing agent (CA1) of Preparation Example 7 to the compound (PN5) of Preparation Example 5 so as to be present at about 0.12 mol per mol of the compound (PN5), and the physical properties were evaluated.

Comparative Example 4

A polymerizable composition was prepared by formulating the curing agent (CA1) of Preparation Example 7 to the compound (PN6) of Preparation Example 6 so as to be present at about 0.12 mol per mol of the compound (PN6), and the physical properties were evaluated.

The results of analysis of the compositions of the Examples and Comparative Examples are described in Table 1 below.

TABLE 1

| | Phthalonitrile monomer | | Curing | | |
|---|---|---|---|---|---|
| | Kind | part by weight (pt) | Processing temperature (° C.) | initiation temperature (° C.) | Process window (° C.) |
| Example 1 | PN1 | 100 | less than 0 | 248 | more than 248 |
| Example 2 | PN2 | 100 | less than 0 | 252 | more than 252 |

TABLE 1-continued

| | Phthalonitrile monomer | | Curing | | |
|---|---|---|---|---|---|
| | Kind | part by weight (pt) | Processing temperature (° C.) | Curing initiation temperature (° C.) | Process window (° C.) |
| Example 3 | PN1 | 20 | 39 | 282 | 243 |
| | PN3 | 80 | | | |
| Example 4 | PN1 | 20 | 39 | 297 | 258 |
| | PN4 | 80 | | | |
| Example 5 | PN1 | 20 | 51 | 283 | 232 |
| | PN5 | 80 | | | |
| Example 6 | PN1 | 20 | 91 | 271 | 180 |
| | PN6 | 80 | | | |
| Example 7 | PN2 | 20 | 38 | 286 | 248 |
| | PN3 | 80 | | | |
| Example 8 | PN2 | 20 | 51 | 273 | 222 |
| | PN5 | 80 | | | |
| Example 9 | PN2 | 50 | 36 | 283 | 247 |
| | PN3 | 50 | | | |
| Example 10 | PN2 | 50 | 50 | 283 | 233 |
| | PN5 | 50 | | | |
| Comparative Example 1 | PN3 | 100 | 78 | 275 | 196 |
| Comparative Example 2 | PN4 | 100 | 175 | 300 | 125 |
| Comparative Example 3 | PN5 | 100 | 228 | 276 | 48 |
| Comparative Example 4 | PN6 | 100 | 231 | 280 | 49 |

The invention claimed is:

1. A phthalonitrile resin comprising a polymerized unit derived from a compound represented by an average composition of Formula 1 below and having at least one or more substituents of Formula 3 below:

$$[R^1R^2{}_2SiO_{1/2}]_a[R^1R^2SiO_{2/2}]_b[R^2{}_2SiO_{2/2}]_c[R^1SiO_{3/2}]_d[R^2SiO_{3/2}]_e[SiO_{4/2}]_f \quad \text{[Formula 1]}$$

wherein, $R^1$ is a substituent of Formula 2 below, $R^2$ is a hydrogen atom, an alkyl group, an alkenyl group or an alkoxy group, a, b and c are each a positive number, d, e and f are each 0 or a positive number, (b+d)/(b+c+d+e) is 0.05 to 0.35, b/(b+c) is 0.05 to 0.35, (b+c)/(a+b+c+d+e+f) is 0.5 to less than 1, and a+b+c+d+e+f is 1:

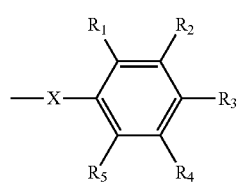

[Formula 2]

wherein, X is a single bond, an oxygen atom, a sulfur atom, —S(═O)$_2$—, a carbonyl group, an alkylene group, an alkenylene group, an alkynylene group, —C(═O)—X$_1$— or —X$_1$—C(═O)—, where X$_1$ is an oxygen atom, a sulfur atom, —S(═O)$_2$—, an alkylene group, an alkenylene group or an alkynylene group, and $R_1$ to $R_5$ are each independently hydrogen, an alkyl group, an alkoxy group, a hydroxy group or a substituent of Formula 3 below

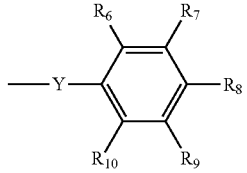

[Formula 3]

wherein, Y is a single bond, an oxygen atom, a sulfur atom, —S(═O)$_2$—, a carbonyl group, an alkylene group, an alkenylene group, an alkynylene group, —C(═O)—X$_2$— or —X$_2$—C(═O)—, where X$_2$ is an oxygen atom, a sulfur atom, —S(═O)$_2$—, an alkylene group, an alkenylene group or an alkynylene group, and $R_6$ to $R_{10}$ are each independently hydrogen, an alkyl group, an alkoxy group or a cyano group, provided that at least two of $R_6$ to $R_{10}$ are each a cyano group; and a polymerized unit of an aromatic amine compound.

2. The phthalonitrile resin according to claim 1, wherein the compound having an average composition of Formula 1 is represented by Formula 4 below:

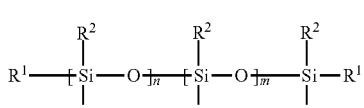

[Formula 4]

wherein, n is a number in a range of 1 to 100, m is a number in a range of 1 to 100, m+n is 2 to 100, and $R^1$ and $R^2$ are each the same as defined in Formula 1 of claim 1.

3. The phthalonitrile resin according to claim 1, further comprising a polymerized unit derived from a phthalonitrile compound having a structure different from the compound represented by the average composition of Formula 1.

4. A composite comprising the phthalonitrile resin of claim 1 and a filler.

5. A polymerizable composition comprising a compound having an average composition of Formula 1 below and having at least one or more substituents of Formula 3 below, and a curing agent:

$$[R^1R^2{}_2SiO_{1/2}]_a[R^1R^2SiO_{2/2}]_b[R^2{}_2SiO_{2/2}]_c[R^1SiO_{3/2}]_d[R^2SiO_{3/2}]_e[SiO_{4/2}]_f \quad \text{[Formula 1]}$$

wherein, $R^1$ is a substituent of Formula 2 below, $R^2$ is a hydrogen atom, an alkyl group, an alkenyl group or an alkoxy group, a, b and c are each a positive number, d, e and f are each 0 or a positive number, (b+d)/(b+c+d+e) is 0.05 to 0.35, b/(b+c) is 0.05 to 0.35, (b+c)/(a+b+c+d+e+f) is 0.5 to less than 1, and a+b+c+d+e+f is 1:

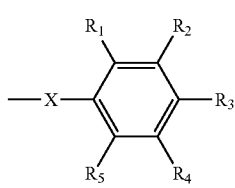

[Formula 2]

wherein, X is a single bond, an oxygen atom, a sulfur atom, —S(═O)$_2$—, a carbonyl group, an alkylene group, an alkenylene group, an alkynylene group, —C(=O)—$X_1$— or —$X_1$—C(=O)—, where $X_1$ is an oxygen atom, a sulfur atom, —S(=O)$_2$—, an alkylene group, an alkenylene group or an alkynylene group, and $R_1$ to $R_5$ are each independently hydrogen, an alkyl group, an alkoxy group, a hydroxy group or a substituent of Formula 3 below

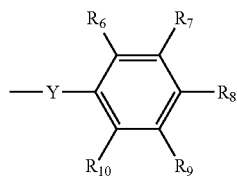

[Formula 3]

wherein, Y is a single bond, an oxygen atom, a sulfur atom, —S(=O)$_2$—, a carbonyl group, an alkylene group, an alkenylene group, an alkynylene group, —C(=O)—$X_2$— or —$X_2$—C(=O)—, where $X_2$ is an oxygen atom, a sulfur atom, —S(=O)$_2$—, an alkylene group, an alkenylene group or an alkynylene group, and $R_6$ to $R_{10}$ are each independently hydrogen, an alkyl group, an alkoxy group or a cyano group, provided that at least two of $R_6$ to $R_{10}$ are each a cyano group.

6. The polymerizable composition according to claim 5, wherein the compound having an average composition of Formula 1 is represented by Formula 4 below:

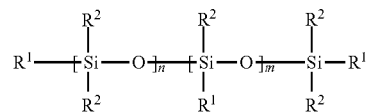

[Formula 4]

wherein, n is a number in a range of 1 to 100, m is a number in a range of 1 to 100, m+n is 2 to 100, and $R^1$ and $R^2$ are each the same as defined in Formula 1 of claim 5.

7. The polymerizable composition according to claim 5, further comprising a phthalonitrile compound having a structure different from the compound represented by the average composition of Formula 1.

8. The polymerizable composition according to claim 5, wherein the curing agent is an aromatic amine compound, a phenol compound, an inorganic acid, an organic acid, a metal, or a metal salt.

* * * * *